Figure 7:
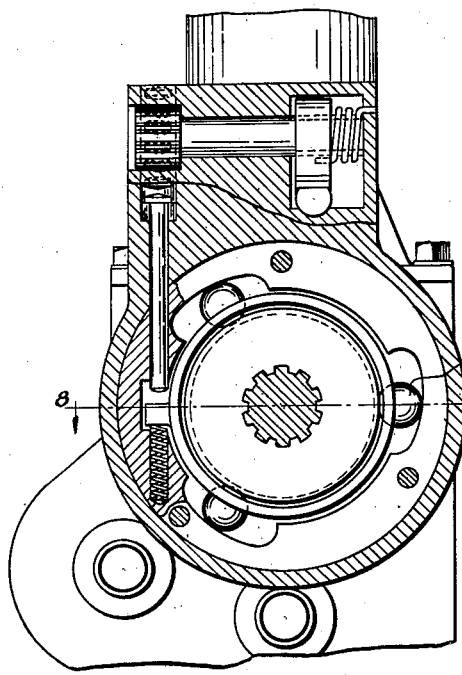

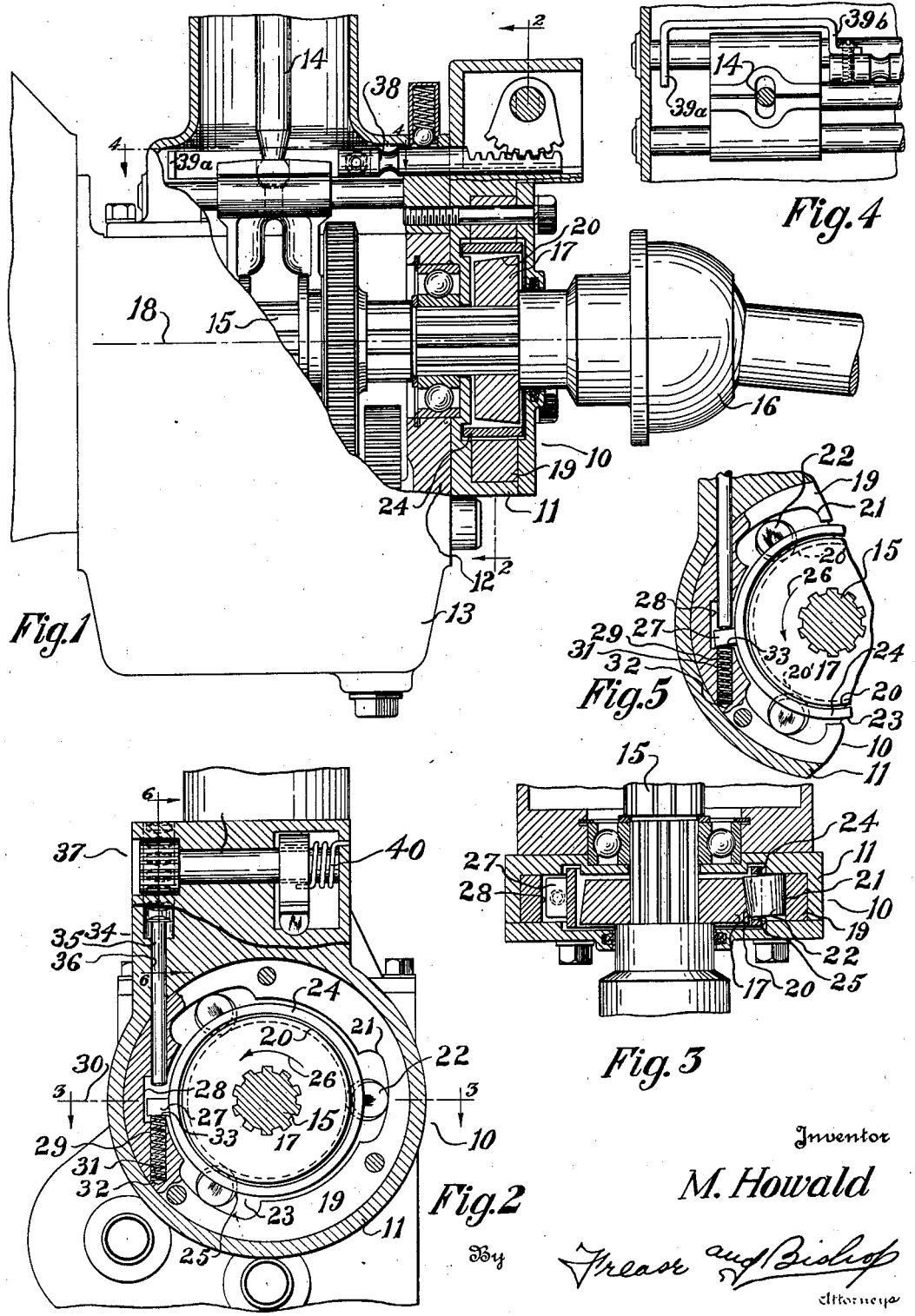

March 22, 1932.   M. HOWALD   1,850,970
ROTARY ENGAGING APPARATUS
Filed Dec. 2, 1930   3 Sheets-Sheet 2

Inventor
M. Howald
By Frease and Bishop
Attorneys

March 22, 1932.   M. HOWALD   1,850,970
ROTARY ENGAGING APPARATUS
Filed Dec. 2, 1930   3 Sheets-Sheet 3

Inventor
M. Howald
By Frease and Bishop
Attorneys

Patented Mar. 22, 1932

1,850,970

UNITED STATES PATENT OFFICE

MELVILLE HOWALD, OF MASSILLON, OHIO

ROTARY ENGAGING APPARATUS

Application filed December 2, 1930. Serial No. 499,465.

My invention includes improvements of the invention set forth in my prior application for patent for Rotary locking apparatus, Serial No. 394,291, filed September 21, 1929, and relates to rotary engaging apparatus more particularly for use as a safety brake in an automobile to prevent the automobile from rolling backward on a hill or an incline when the automobile has been stopped on the hill and the gear shift and transmission is in one of the forward speed positions or in neutral.

The invention is applicable however to any machinery where it is desired to lock or engage a rotatable member to another member, or to any reversing machinery in which it is desired to prevent reverse rotation of a shaft excepting under the control of the operator.

Greater safety in operation of automobiles or other machinery is attained by the use of such safety brakes or clutches.

As heretofore designed, however, safety brakes intended for automotive uses, have frequently failed to operate with sufficient rapidity to prevent the automobile attaining a backward momentum which could not be overcome.

On the other hand, when shifting the gears into reverse it is necessary to render the safety brake inoperative in order that the drive shaft may turn in the reverse direction, and when a conscious effort of the automobile driver is required for rendering a safety clutch inoperative, accidents very frequently occur.

Rotary engaging apparatus in use prior to my aforesaid application Serial No. 394,291, include rolling members operatively mounted between inner and outer raceways formed respectively in members, one of which is adapted for rotation about an axis, and one of the raceways being spiral, or one of the raceways being angled with respect to the axis of rotation.

In the one case, the rolling members are moved radially towards or away from the axis of rotation; and in the other case the rolling members are moved longitudinally of the axis of rotation; but in either case, immediate operation of the clutch has been impossible to attain.

The primary difference between the rotary engaging or locking apparatus of my prior application, and of the present invention, and such apparatus heretofore in use as aforesaid, consists in the fact that the rolling members of any of my improved apparatus are in every case simultaneously and immediately moved radially and longitudinally with respect to the axis of rotation, during locking operation of the apparatus, and the immediate operation of my improved apparatus arises primarily from such combined radial and longitudinal movement of the rolling or locking members.

The rotary engaging or locking apparatus of my aforesaid prior application, illustrated and described in detail only ball rolling members.

The objects of the present improvements include the provision of a novel rotary engaging apparatus, particularly adapted for use as an automotive safety brake and in which the gripping and release are substantially instantaneous at the desired times, which utilizes the mode of operation set forth in my aforesaid prior application, and in which tapered rolling members are used in order to reduce unit pressures between the rolling members and the raceway members during the locking or gripping of the apparatus.

The use of tapered rolling members also improves the operation of the apparatus.

The foregoing and other objects are attained by the apparatus, parts, embodiments, and combinations which comprise the present invention, and which are particularly and distinctly pointed out and set forth in the appended claims forming part hereof.

Figure 8:
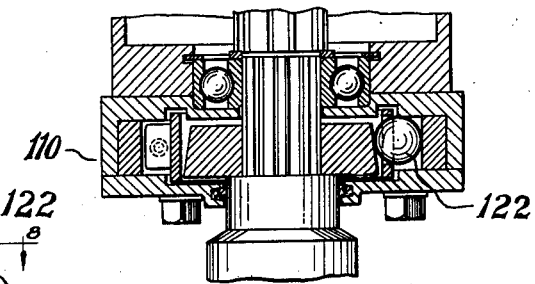
Figure 6:
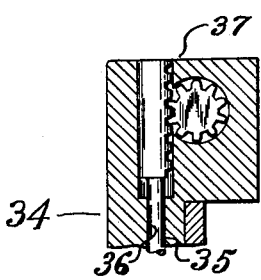
Figure 9:
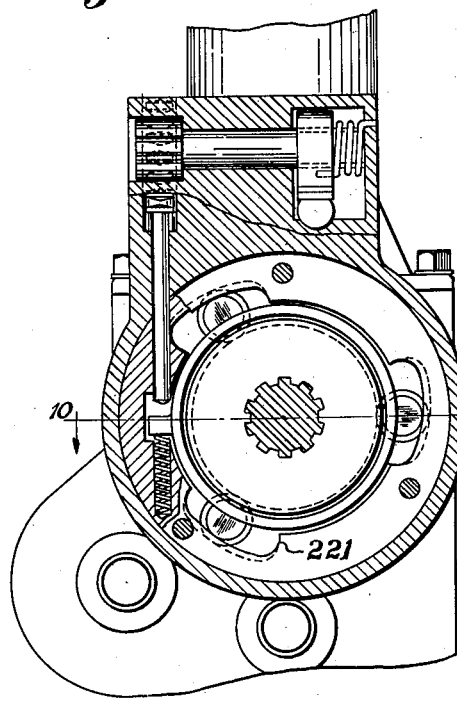
Figure 10:
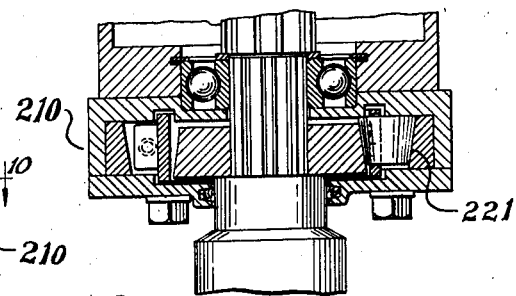
Figure 11:
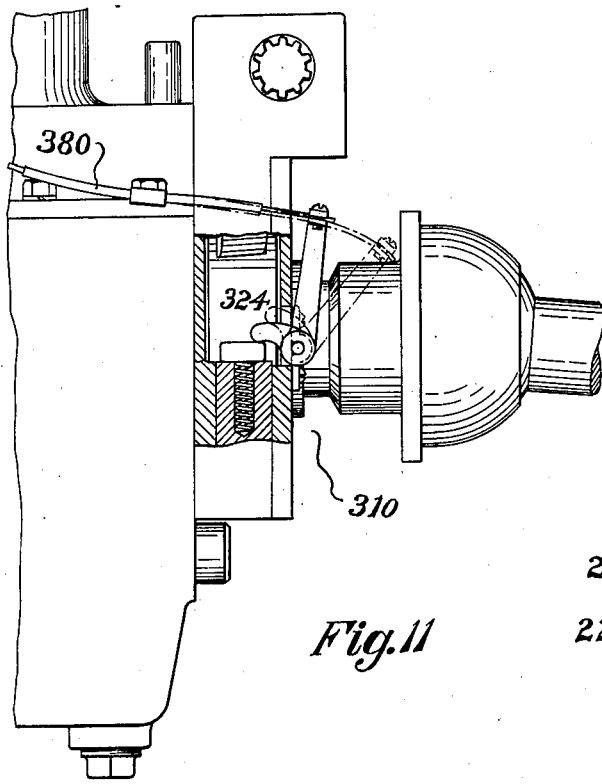
Figure 12:
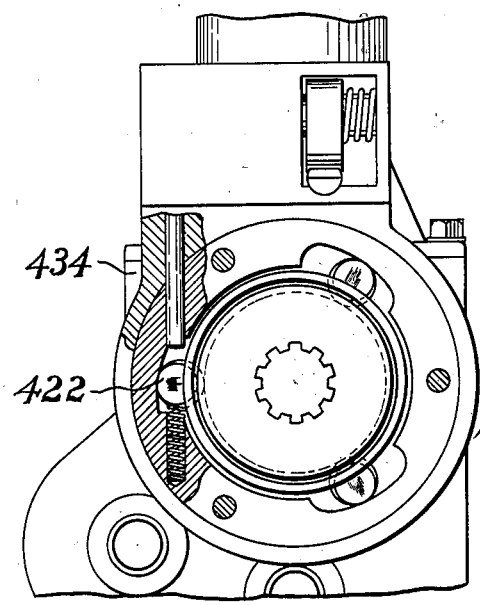
Figure 13:
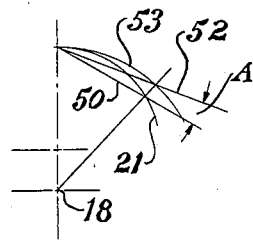
Figure 14:
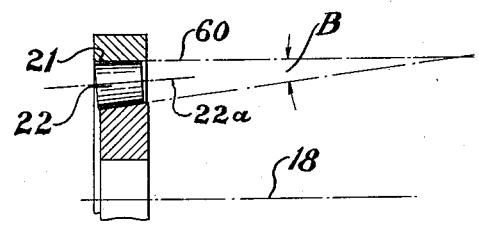
Figure 15:
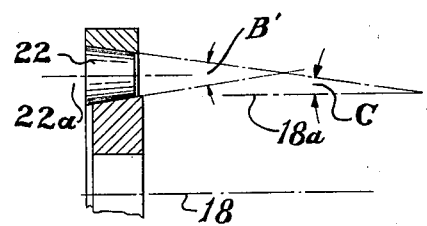

Preferred embodiments of the invention are illustrated in the accompanying drawings forming part hereof, in which Figure 1 is a fragmentary side elevation view with portions in section, illustrating one embodiment of my improved apparatus in the form of a safety brake including tapered rolling members applied to the transmission of an automobile or the like;

Fig. 2, a fragmentary vertical offset transverse sectional view thereof as on line 2—2, Fig. 1, the parts being illustrated in their relative positions just ready for locking engagement with each other;

Fig. 3, a fragmentary horizontal transverse sectional view thereof as on line 3—3, Fig. 2;

Fig. 4, a fragmentary horizontal sectional view as on line 4—4, Fig. 1;

Fig. 5, a fragmentary view similar to Fig. 2 illustrating parts of the apparatus in their relative positions when the releasing means are operative;

Fig. 6, a fragmentary sectional view as on line 6—6, Fig. 2 illustrating portions of the releasing means;

Fig. 7, a view similar to Fig. 2 illustrating a second embodiment of the improved apparatus including ball rolling members;

Fig. 8, a fragmentary horizontal transverse sectional view as on line 8—8, Fig. 7;

Fig. 9, a view similar to Fig. 2, illustrating a third embodiment of the improved apparatus, including tapered rolling members;

Fig. 10, a horizontal transverse sectional view thereof as on line 10—10, Fig. 9;

Fig. 11, a fragmentary elevation view with portions in section illustrating a fourth embodiment of the improved apparatus;

Fig. 12, a fragmentary view similar to Fig. 2, illustrating a fifth embodiment of the improved apparatus; and Figs. 13, 14, and 15, diagrammatic views illustrating preferred forms of the improvements.

Similar numerals refer to similar parts throughout the several views.

The embodiment of the improved rotary engaging apparatus, in the form of a safety brake in combination with the transmission of an automobile indicated generally at 10 in Figs. 1 to 6 inclusive, may include a case 11 which may be secured upon the rear wall 12 of a transmission housing 13 of an automobile or the like.

The transmission housing mounts in any usual manner, gear sets for attaining one or more forward speeds and a reverse, and the gear sets may be actuated in a usual manner by a gear shift lever 14.

The transmission includes a power take-off shaft 15 to which the several forward and reverse rotary speeds are imparted, and which extends through the rear wall 12. The shaft 15 may be preferably splined as illustrated, and extends through the case 11 at the rear of which the shaft 15 may be connected through a universal joint 16 with the usual intermediate shaft, rear universal joint, and rear axle differential drive of an automobile, not shown.

An inner member 17 is secured on the shaft 15 within the case 11, and rotates with the shaft 15 about the axis of rotation thereof indicated by the dot-dash line 18. An outer member 19 is secured within the housing 11 adjacent the inner member 17, and the outer member 19 is normally stationary with respect to the rotating shaft 15 and inner member 17.

The inner member 17 as illustrated comprises a disk and preferably has formed on its outer periphery a raceway surface 20, and the raceway surface 20 is preferably a closed conical surface of revolution, the axis of which coincides with the axis of rotation 18 of the inner member 17.

The outer member 19 as illustrated preferably comprises a ring, and has formed on its inner periphery preferably three spaced raceway surfaces 21. Each raceway surface 21 may be spiralled with respect to the axis of rotation 18, but in order to attain ease of manufacture, each raceway surface 21 is preferably a portion of a surface of revolution which, in the embodiment 10, is a cylinder whose axis is eccentric to the axis of rotation 18.

A tapered or frusto-conical rolling member 22 is interposed between the continuous conical raceway surface 20 of the inner rotatable member 17 and each of the spaced eccentric raceway surfaces 21 of the outer member 19.

Means indicated generally by 23 are provided for maintaining the rolling members 22 equally circumferentially spaced from each other.

The spacing means 23 preferably includes a ring cage 24 interposed between the inner member 17 and the outer member 19, and there being formed in the ring cage 24 three equally spaced slots 25 extending in the direction of the axis 18, and each frusto-conical rolling member 22 is located in one of the slots 25, and the action of the ring cage 24 on the rolling members 22 is similar to the action of a roller bearing cage in the rollers of the bearing.

The arrow 26 indicates the direction of rotation of the shaft 15 and the inner member 17 for normal forward movement of the automobile.

It will be seen that each raceway surface 21 diverges in this direction from the axis of rotation 18, so that there is no tendency for the rolling members to engage between the opposite raceway surfaces 20 and 21 when the shaft 15 is rotating in the direction of the arrow 26.

For maintaining the rolling members in position for immediate locking engagement by the opposite raceway surfaces 20 and 21 substantially instantaneously with an imperceptible rotation of the shaft 15 in a direction opposite to the arrow 26, a tongue 27 extends from one side of the ring 24 into a side opening chamber 28 formed in the opposite inner face of the outer member 19 preferably between two of the spaced raceway surfaces 21 thereof.

Preferably at right angles to the direction of the tongue 27, a bore 29 is formed in the outer member 19, preferably below the normally horizontal transverse axis 30 of the apparatus.

A compression spring 31 is interposed between the base 32 of the bore 29 and the under side 33 of the tongue 27, and the force of the compression spring 31 is of sufficient magnitude to normally maintain the ring cage 24 in the position illustrated in Fig. 2, whereby the rolling members 22 are preferably maintained in a contact position between the raceway surfaces ready for making locking engagement between the raceway surfaces with any imperceptible reverse rotation of the shaft 15.

Means indicated generally by 34 are provided for operating on all of the rolling members 22 preferably through the ring cage 24 for selectively maintaining the rolling members out of position for being engaged by the raceway surfaces, when it is desired to reverse the direction of rotation of the shaft 15, as in reversing the automobile.

The releasing means 34 are of novel construction and arrangement, and include a push rod 35 slidably mounted in a bore 36 located above the normally horizontal transverse axis 30 of the apparatus, and the longitudinal axis of the bore 36 is preferably common with the longitudinal axis of the spring containing bore 29.

Gearing indicated generally by 37 operatively connect the upper end of the push rod 35 with a normally horizontal actuating bar 38 which is operatively associated with the gear shift lever 14, as by tongues 39a and 39b secured on the actuating shaft 38, the tongues 39a and 39b being in the path of movement of the gear shift lever when moving to and from the position for setting the gears for reverse drive.

When the gear shift lever is shifted to the reverse position, the plunger 35 is moved downwardly and its lower end abuts the upper face of the tongue 27 and moves the ring cage 24 in the direction of the arrow 26, and consequently moves the rolling members 22 out of position for being engaged between the raceway surfaces 20 and 21, as illustrated in Fig. 5.

Spring means 40 operatively connected between the case 11 and the gearing 37 normally maintain the push rod 35 in the inoperative position illustrated in Fig. 2.

The second embodiment of the improved apparatus indicated generally at 110 in Figs. 7 and 8, includes ball rolling members 122, and is otherwise identical with the embodiment 10.

In the embodiment 10, as illustrated the eccentric raceway surfaces 21 are cylindric surfaces.

In Figs. 9 and 10 the third embodiment of the apparatus indicated generally by 210 includes raceway surfaces 221 which are eccentric conical surfaces, and otherwise the apparatus 210 is similar to the apparatus 10.

The fourth embodiment of the improved apparatus indicated generally by 310 in Fig. 11 is identical with the embodiment 10 with the addition of means 380 operative from the dash board or the like, in addition to the control through the gear shift lever, for maintaining the apparatus in released position by movement of the raceway ring cage 324 to the releasing position.

In the fifth embodiment of the improved apparatus indicated generally by 410 in Fig. 12, the releasing means 434 operate on a rolling member 422, instead of on the cage as in the embodiment 10.

Referring to Fig. 13, it has been determined that the most satisfactory operation of the improved apparatus under all conditions is attained when the chord 50 of one of the eccentric raceway surfaces, for example 21, in a plane perpendicular to the axis of rotation 18, makes an angle A of substantially 8° with the chord 52 of a circle 53 in the same plane, the center of the circle 53 coinciding with the axis 18, and the circle 53 passing through one end of the chord 50 of the eccentric surface.

It has furthermore been determined that for the best operation of the apparatus the angle A should not be less than 7° and 45' and not greater than 8° and 15'.

Referring to Fig. 14, when an element 60 of one of the raceway surfaces, as for example a surface 21, is a cylindrical element, or in other words parallel with the axis of rotation 18, it has been determined that the angle B between elements of the frusto-conical rolling member 22 lying in a plane passing through the longitudinal axis 22a of the rolling member 22 should be substantially 4°.

It has furthermore been determined that the best operation of the improved apparatus is attained when the angle B is not less than 3° and 8' and not greater than 4° and 45'.

Referring to Fig. 15, neither of the opposed raceway surfaces of the members are cylindric, it has been determined that the best operation of the apparatus is attained when the angle B' between elements of each frusto-conical rolling member 22 lying in a plane passing through the longitudinal axis 22a thereof is not greater than 9° and 30', and when an element of one of the raceway surfaces makes an angle C with a line 18a parallel with the axis of rotation 18, of not less than 3° and 8', and the angle of the other raceway member being such as to fit the opposite side of the frusto-conical rolling member in engaging position.

I claim:

1. Rotary engaging apparatus including two members adjacent each other, there being one or more raceway surfaces formed on each member, rolling members interposed between the raceway surfaces, one of the members being adapted for rotation about an axis, and the raceway surface of one member being eccentric with respect to the axis of rotation, and the raceway surface of the other member being angled with respect to the axis of rotation, and means for maintaining the rolling members circumferentially spaced from each other.

2. Rotary engaging apparatus including two members adjacent each other, there being one or more raceway surfaces formed on each member, tapered rolling members interposed between the raceway surfaces, one of the members being adapted for rotation about an axis, the raceway surface of one member being eccentric with respect to the axis of rotation, and the raceway surface of the other member being angled with respect to the axis of rotation, and means for maintaining the rolling members circumferentially spaced from each other.

3. Rotary engaging apparatus including two members adjacent each other, there being one or more raceway surfaces formed on each member, rolling members interposed between the raceway surfaces, one of the members being adapted for rotation about an axis, the raceway surface of one member being spiralled with respect to the axis of rotation, and the raceway surface of the other member being angled with respect to the axis of rotation, and means for maintaining the rolling members circumferentially spaced from each other.

4. Rotary engaging apparatus including two members adjacent each other, there being one or more raceway surfaces formed on each member, tapered rolling members interposed between the raceway surfaces, one of the members being adapted for rotation about an axis, the raceway surface of one member being spiralled with respect to the axis of rotation, and the raceway surface of the other member being angled with respect to the axis of rotation, and means for maintaining the rolling members circumferentially spaced from each other.

5. Rotary engaging apparatus including two members adjacent each other, there being a raceway surface formed on each member, a rolling member interposed between the raceways, one of the members being adapted for rotation about an axis, the raceway surface of one member being eccentric with respect to the axis of rotation, and the raceway surface of the other member being angled with respect to the axis of rotation, a chord of the eccentric raceway surface in a plane perpendicular to the axis of rotation having an angle of substantially 8° with the chord of a circle in the same plane whose center coincides with the axis of rotation and which passes through one end of the chord of the eccentric surface.

6. Rotary engaging apparatus including two members adjacent each other, there being a raceway surface formed on each member, a tapered rolling member interposed between the raceway surfaces, one of the members being adapted for rotation about an axis, the raceway surface of one member being eccentric with respect to the axis of rotation, and the raceway surface of the other member being angled with respect to the axis of rotation, a chord of the eccentric raceway surface in a plane perpendicular to the axis of rotation having an angle of substantially 8° with the chord of a circle in the same plane whose center coincides with the axis of rotation and which passes through one end of the chord of the eccentric surface.

7. Rotary engaging apparatus including two members adjacent each other, there being a raceway surface formed on each member, a rolling member interposed between the raceway surfaces, one of the members being adapted for rotation about an axis, the raceway surface of one member being eccentric with respect to the axis of rotation, and the raceway surface of the other member being angled with respect to the axis of rotation, a chord of the eccentric raceway surface in a plane perpendicular to the axis of rotation having an angle of not less than 7° and 45' and not greater than 8° and 15' with the chord of a circle in the same plane whose center coincides with the axis of rotation and which passes through one end of the chord of the eccentric surface.

8. Rotary engaging apparatus including two members adjacent each other, there being a raceway surface formed on each member, a tapered rolling member interposed between the raceways, one of the members being adapted for rotation about an axis, and the raceway surface of one member being eccentric with respect to the axis of rotation, and the raceway surface of the other member being angled with respect to the axis of rotation, a chord of the eccentric raceway surface in a plane perpendicular to the axis of rotation having an angle of not less than 7° and 45' and not greater than 8° and 15' with the chord of a circle in the same plane whose center coincides with the axis of rotation and which passes through one end of the chord of the eccentric surface.

9. Rotary engaging apparatus including two members adjacent each other, there being a raceway surface formed on each member, a frusto-conical rolling member interposed between the raceway surfaces, one of the members being adapted for rotation about an axis, the raceway surface of one member being eccentric with respect to the axis of rotation, and the elements of one of the raceway surfaces being parallel with the axis of rotation, and the angle between elements of the frusto-conical rolling member lying in a plane passing through the longitudinal axis thereof being substantially 4°.

10. Rotary engaging apparatus including two members adjacent each other, there being a raceway surface formed on each member, a frusto-conical rolling member interposed between the raceway surfaces, one of the members being adapted for rotation about an axis, the raceway surface of one member being eccentric with respect to the axis of rotation, and the elements of one of the raceway surfaces being parallel with the axis of rotation, and the angle between elements of the frusto-conical rolling member lying in a plane passing through the longitudinal axis thereof being not less than 3° and 8′ and not greater than 4° and 45′.

11. Rotary engaging apparatus including two members adjacent each other, there being a raceway surface formed in each member, a frusto-conical rolling member interposed between the raceway surfaces, one of the members being adapted for rotation about an axis, the raceway surface of one member being eccentric with respect to the axis of revolution, the angle between elements of the frusto-conical rolling member lying in a plane passing through the longitudinal axis thereof being not greater than 9° and 30′, and the angle between elements of the opposite raceway surfaces lying in a plane passing through the axis of rotation being equal to the angle between the elements of the rolling member.

12. Rotary engaging apparatus including two members adjacent each other, there being a raceway surface formed in each member, a frusto-conical rolling member interposed between the raceway surfaces, one of the members being adapted for rotation about an axis, the raceway surface of one member being eccentric with respect to the axis of revolution, the angle between elements of the frusto-conical rolling member lying in a plane passing through the longitudinal axis thereof being not greater than 90° and 30′, and the angle between elements of the opposite raceway surfaces lying in a plane passing through the axis of rotation being equal to the angle between the elements of the rolling member, and the angle between an element of one of the raceway surfaces and the axis of rotation in a plane passing through the axis of rotation being not less than 3° and 8′.

13. Rotary engaging apparatus including two members adjacent each other, there being a closed raceway surface of revolution formed on one member, and there being a plurality of spaced raceway surfaces formed on the other member, each spaced raceway surface comprising a portion of a surface of revolution, a rolling member interposed between the continuous raceway surface of the one member and each of the spaced raceway surfaces of the other member, one of the members being adapted for rotation about an axis, each spaced raceway surface being eccentric with respect to the axis of rotation, and the axis of rotation coinciding with the axis of the continuous surface, and a chord of each eccentric raceway surface in a plane perpendicular to the axis of rotation, having an angle of substantially 8° with the chord of a circle in the same plane whose center coincides with the axis of rotation and which passes through one end of the chord of the eccentric surface.

14. Rotary engaging apparatus including two members adjacent each other, there being a closed raceway surface of revolution formed on one member, and there being a plurality of spaced raceway surfaces formed on the other member, each spaced raceway surface comprising a portion of a surface of revolution, a rolling member interposed between the continuous raceway surface of the one member and each of the spaced raceway surfaces of the other member, one of the members being adapted for rotation about an axis, each spaced raceway surface being eccentric with respect to the axis of rotation, and the axis of rotation coinciding with the axis of the continuous surface, and means for maintaining the rolling members circumferentially spaced from each other, and a chord of each eccentric raceway surface in a plane perpendicular to the axis of rotation, having an angle of substantially 8° with the chord of a circle in the same plane whose center coincides with the axis of rotation and which passes through one end of the chord of the eccentric surface.

15. Rotary engaging apparatus including two members adjacent each other, there being a raceway surface formed in each member, a frusto-conical rolling member interposed between the raceway surfaces, one of the members being adapted for rotation about an axis, the raceway surface of one member being eccentric with respect to the axis of revolution, the angle between elements of the frusto-conical rolling member lying in a plane passing through the longitudinal axis thereof being not greater than 9° and 30′, and the angle between elements of the opposite raceway surfaces lying in a plane passing through the axis of rotation being equal to the angle between the elements of the rolling member, and a chord of each eccentric raceway surface in a plane perpendicular to the axis of rotation having an angle of substantially 8° with the chord of a circle in the same plane whose center coincides with the axis of rotation and which passes through one end of the chord of the eccentric surface.

16. Rotary engaging apparatus including two members adjacent each other, there being a closed raceway surface of revolution formed on one member, and there being a plurality of spaced raceway surfaces formed on the other member, each spaced raceway surface comprising a portion of a surface of revolution, a frusto-conical rolling member interposed between the continuous raceway surface of the one member and each of the spaced raceway surfaces of the other member, one of the members being adapted for rotation about an axis, each spaced raceway surface being eccentric with respect to the axis of rotation, and the axis of rotation coinciding with the axis of the continuous surface, and a chord of each eccentric raceway surface in a plane perpendicular to the axis of rotation, having an angle of substantially 8° with the chord of a circle in the same plane whose center coincides with the axis of rotation and which passes through one end of the chord of the eccentric surface, and the angle between elements of each frusto-conical rolling member lying in a plane passing through the longitudinal axis thereof being not greater than 9° and 30′, and the angle between elements of the opposite raceway surfaces lying in a plane passing through the axis of rotation being equal to the angle between the elements of the rolling members.

17. Rotary engaging apparatus including two members adjacent each other, there being a closed raceway surface of revolution formed on one member, and there being a plurality of spaced raceway surfaces formed on the other member, each spaced raceway surface comprising a portion of a surface of revolution, a frusto-conical rolling member interposed between the continuous raceway surface of the one member and each of the spaced raceway surfaces of the other member, one of the members being adapted for rotation about an axis, each spaced raceway surface being eccentric with respect to the axis of rotation, and the axis of rotation coinciding with the axis of the continuous surface, and means for maintaining the rolling members circumferentially spaced from each other, and a chord of each eccentric raceway surface in a plane perpendicular to the axis of rotation, having an angle of substantially 8° with the chord of a circle in the same plane whose center coincides with the axis of rotation and which passes through one end of the chord of the eccentric surface, and the angle between elements of each frusto-conical rolling member lying in a plane passing through the longitudinal axis thereof being not greater than 9° and 30′, and the angle between elements of the opposite raceway surfaces lying in a plane passing through the axis of rotation being equal to the angle between the elements of the rolling members.

18. Rotary engaging apparatus including two members adjacent each other, there being a closed raceway surface of revolution formed on one member, and there being a plurality of spaced raceway surfaces formed on the other member, each spaced raceway surface comprising a portion of a surface of revolution, a rolling member interposed between the continuous raceway surface of the one member and each of the spaced raceway surfaces of the other member, one of the members being adapted for rotation about an axis, each spaced raceway surface being eccentric with respect to the axis of rotation, and the axis of rotation coinciding with the axis of the continuous surface, and a chord of each eccentric raceway surface in a plane perpendicular to the axis of rotation, having an angle of substantially 8° with the chord of a circle in the same plane whose center coincides with the axis of rotation and which passes through one end of the chord of the eccentric surface, and means for maintaining the rolling members circumferentially spaced from each other.

19. Rotary engaging apparatus including two members adjacent each other, there being a closed raceway surface of revolution formed on one member, and there being a plurality of spaced raceway surfaces formed on the other member, each spaced raceway surface comprising a portion of a surface of revolution, a rolling member interposed between the continuous raceway surface of the one member and each of the spaced raceway surfaces of the other member, one of the members being adapted for rotation about an axis, each spaced raceway surface being eccentric with respect to the axis of rotation, and the axis of rotation coinciding with the axis of the continuous surface, and means for maintaining the rolling members circumferentially spaced from each other, and a chord of each eccentric raceway surface in a plane perpendicular to the axis of rotation, having an angle of substantially 8° with the chord of a circle in the same plane whose center coincides with the axis of rotation and which passes through one end of the chord of the eccentric surface, and means for maintaining the rolling members circumferentially spaced from each other.

20. Rotary engaging apparatus, including two members adjacent each other, there being a closed raceway surface of revolution formed on one member, and there being a plurality of spaced raceway surfaces formed on the other member, each spaced raceway surface comprising a portion of a surface of revolution, a frusto-conical rolling member interposed between the continuous raceway surface of the one member and each of the spaced raceway surfaces of the other member, one of the members being adapted for rotation about an axis, each spaced raceway surface being eccentric with respect to the axis of rotation, and the axis of rotation coinciding with the axis of the continuous surface, and a chord of each eccentric raceway surface in a plane perpendicular to the axis of rotation, having an angle of substantially 8° with the chord of a circle in the same plane whose center coincides with the axis of rotation and which passes through one end of the chord of the eccentric surface, and the angle between elements of each frusto-conical rolling member lying in a plane passing through the longitudinal axis thereof being not greater than 9° and 30′, and the angle between elements of the opposite raceway surfaces lying in a plane passing through the axis of rotation being equal to the angle between the elements of the rolling members, and means for maintaining the rolling members circumferentially spaced from each other.

21. Rotary engaging apparatus including two members adjacent each other. there being a closed raceway surface of revolution formed on one member, and there being a plurality of spaced raceway surfaces formed on the other member, each spaced raceway surface comprising a portion of a surface of revolution, a frusto-conical rolling member interposed between the continuous raceway surface of the one member and each of the spaced raceway surfaces of the other member, one of the members being adapted for rotation about an axis, each spaced raceway surface being eccentric with respect to the axis of rotation, and the axis of rotation coinciding with the axis of the continuous surface, and means for maintaining the rolling members circumferentially spaced from each other, and a chord of each eccentric raceway surface in a plane perpendicular to the axis of rotation, having an angle of substantially 8° with the chord of a circle in the same plane whose center coincides with the axis of rotation and which passes through one end of the chord of the eccentric surface, and the angle between elements of each frusto-conical rolling member lying in a plane passing through the longitudinal axis thereof being not greater than 9° and 30′, and the angle between elements of the opposite raceway surfaces lying in a plane passing through the axis of rotation being equal to the angle between the elements of the rolling members, and means operatively connected with the rolling members for selectively maintaining the rolling members out of position for being engaged by the raceway surfaces.

In testimony that I claim the above, I have hereunto subscribed my name.

MELVILLE HOWALD.